United States Patent
Haverlag et al.

(10) Patent No.: US 12,133,312 B2
(45) Date of Patent: Oct. 29, 2024

(54) NETWORKED SYSTEM, HAVING A CONTROLLING DEVICE AND A PLURALITY OF CONTROLLED DEVICES, AND DEVICES AND METHODS USED BY THE SYSTEM

(71) Applicant: SIGNIFY HOLDING B.V., Eindhoven (NL)

(72) Inventors: Marco Haverlag, Mierlo (NL); Leendert Teunis Rozendaal, Valkenswaard (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 141 days.

(21) Appl. No.: 17/780,086

(22) PCT Filed: Nov. 23, 2020

(86) PCT No.: PCT/EP2020/083035
§ 371 (c)(1),
(2) Date: May 26, 2022

(87) PCT Pub. No.: WO2021/105050
PCT Pub. Date: Jun. 3, 2021

(65) Prior Publication Data
US 2023/0010865 A1    Jan. 12, 2023

(30) Foreign Application Priority Data
Nov. 29, 2019  (EP) ..................... 19212410

(51) Int. Cl.
*H05B 47/10*    (2020.01)
*H04L 12/28*    (2006.01)
*H05B 47/175*   (2020.01)

(52) U.S. Cl.
CPC ....... *H05B 47/175* (2020.01); *H04L 12/2816* (2013.01); *H04L 12/2823* (2013.01)

(58) Field of Classification Search
None
See application file for complete search history.

(56) References Cited

U.S. PATENT DOCUMENTS

| | | | |
|---|---|---|---|
| 9,526,030 B2 | 12/2016 | Goergen et al. | |
| 9,985,750 B2 | 5/2018 | Maaref et al. | |
| 10,085,328 B2 | 9/2018 | Barna et al. | |
| 10,355,921 B2* | 7/2019 | Turvy, Jr. | H04L 41/0803 |
| 10,397,823 B2 | 8/2019 | Gorgen et al. | |
| 2010/0164386 A1* | 7/2010 | You | H05B 47/19 315/129 |
| 2015/0092529 A1 | 4/2015 | Vasseur et al. | |
| 2018/0027631 A1* | 1/2018 | Turvy, Jr. | G08C 17/02 315/307 |
| 2018/0338370 A1* | 11/2018 | Shukla | G05B 19/0421 |
| 2019/0008024 A1 | 1/2019 | Hidaka | |

FOREIGN PATENT DOCUMENTS

KR    101863551 B1    6/2018

* cited by examiner

Primary Examiner — Jimmy T Vu

(57) ABSTRACT

A networked system has a first device which sends commands to one or more other devices. If those other devices are able to follow the commands, they inhibit reporting of their status. Thus, network status data is maintained based on the commands, unless status reports indicate that the commands could not be followed or that status changes have been made which were not in response to commands from the first device.

15 Claims, 3 Drawing Sheets

NETWORKED SYSTEM, HAVING A CONTROLLING DEVICE AND A PLURALITY OF CONTROLLED DEVICES, AND DEVICES AND METHODS USED BY THE SYSTEM

CROSS-REFERENCE TO PRIOR APPLICATIONS

This application is the U.S. National Phase application under 35 U.S.C. § 371 of International Application No. PCT/EP2020/083035, filed on Nov. 23, 2020, which claims the benefit of European Patent Application No. 19212410.5, filed on Nov. 29, 2019. These applications are hereby incorporated by reference herein.

FIELD OF THE INVENTION

This invention relates to networked systems, having a controlling device and a plurality of controlled devices. It also relates to devices and methods used by the system.

BACKGROUND OF THE INVENTION

The invention is of general interest to networks of devices, but it has particular application to networked lighting systems.

There is an ongoing trend in the professional lighting market to move more and more towards connected lighting systems which enable all kinds of new features to be implemented. These new features for example comprise remote scheduling, energy monitoring, sensor-based lighting control and asset management.

In order to limit the amount of wiring in an installation, local area wireless communication is quickly becoming popular as a means of sending lighting commands to each node and assessing the status of each luminaire.

Examples of such wireless network protocols which are used widely in current practice are open standards like Zigbee, Thread, BLE mesh, Wi-Fi (Trade Marks), and various proprietary network implementations built on top of the IEEE 802.15.4, 802.15.1 or 802.11* standards.

In some cases, these systems can consist of many wireless nodes, and a careful network design is needed in order to avoid that messages become lost due to collisions of network packages with each other.

Since packet collisions can never be avoided completely, most of these network protocols have retry mechanisms in place in case a packet did not reach its destination (and/or the acknowledgement of reception did not get back to the command issuer).

In many cases the network can be so large (in distance) that not all nodes can be reached directly from a central controller, and some network protocols therefore have implemented mechanisms to send messages via other nodes. In this way, remote nodes can also be reached via one or multiple 'hops'.

Messages that require many hops lead to extra traffic on the network, since the network packet needs to be re-transmitted several times in order to reach the destination node.

This leads to the situation that sending a command from a central controller to many nodes (or receiving information from many nodes by a central controller) requires clever methods to avoid packet collisions.

US2018/0027631 A1 is directed at a monitor lighting control device that receives a state change event message that includes (i) a state change event, such as an event reported by an occupancy sensor, or on/off switch, (ii) an identifier of a member lighting control device that detected the event and (iii) a control group identifier of a lighting control group that includes the member of the lighting control device and the monitor lighting control device. The monitor lighting control devices sends an acknowledgement to the member lighting control device and then transmits a multicast message that includes the state change event to the lighting control group. In order to handle multiple concurrent group/zone state change requests, the monitor lighting control device on receipt of a new state change checks whether a change is in progress and if so cancels that state change and executes the new state change.

US2019/008024 A1 is directed to a method of pairing an access device with luminaires, to this end an access device broadcasts a first command and luminaires in response transmit first information comprising its luminaire identifier and a radio field intensity to access devices. The access device then forwards its identifier and parts of the first information to a illumination controller. When determining that a predetermined luminaire has transmitted the first information to only one access device, the illumination controller pairs the predetermined luminaire and the one access device. When determining that the predetermined luminaire has transmitted the first information to the plural access devices, the illumination controller determines that the predetermined luminaire and an access device among the plural access devices which has a highest radio field intensity are to be paired.

For sending lighting control commands, broadcasting is an efficient way to send a control message to a large number of nodes. A broadcast message can be received by many nodes at the same time, and if each node repeats the message a few times the chance of missing the command becomes low enough to be acceptable. Depending on the size and density of the network, the number of repeats can be configured (in some networks), in order to restrain the 'network storm' that happens during a broadcast. Without such restraint, each node will typically resend the message once, meaning a single broadcast message in a 200-node network can lead to 200 RF transmissions if such restraint is not applied.

Getting the command from the central controller to the luminaire control nodes therefore is easily possible, even in networks consisting of large numbers of nodes. In the opposite direction, however, difficulties arise. For example, if it is desired to verify the status of each network device, e.g. luminaire (on/off status, dimming status, color point, energy usage, error status), a unicast message has to be sent from the central controller to each node, and a response with the requested data has to return back towards the controller. If the node is outside direct communication range from the controller, this will result in a number of network messages going both up and down. If the network size is large (in distance), this means querying the status of each node can only be done at large intervals, which may not be enough for the application at hand.

This invention is directed in particular to problems that arise when there is a large network with a controlling device (which may be a central controller or just a device performing controlling role at that time), and it is desired to minimize traffic related to status reporting of nodes in response to changes in their status.

SUMMARY OF THE INVENTION

The invention is defined by the claims.

According to examples in accordance with an aspect of the invention, there is provided a networked system, comprising:
 a first device which performs a controlling function;
 a status monitoring device; and
 a plurality of controlled devices, wherein the first device is adapted to send control commands to the controlled devices and the controlled devices are adapted to send status report messages to the status monitoring device,
 wherein each controlled device comprises a controlled device receiver for receiving control commands, a controlled device transmitter and a controlled device processor, wherein the controlled device processor is adapted to:
  receive a control command to change device status either from the first device or from another source of commands;
  change the device status in response to the control command if the controlled device is able to adhere to the command;
  determine if the control command originated at the first device;
  if the control command originated at the first device and has been adhered to, to inhibit sending of a status report message to the status monitoring device; and
  if the control command did not originate at the first device, to send a status report message to the status monitoring device.

Note that the first device may be co-located with the status monitoring device in a centralized unit, i.e. the centralized unit may both issue control commands as well as monitor the status of the devices of the network. The centralized unit may then for example be a network controller.

The controlled devices of this networked system send status report messages when they have changed status in response to received commands or other events such as switching on the mains power and/or local control units. This is known as attribute reporting. However, a status update is not given if the controlled device has correctly changed status in response to commands from the first device. This reduces the amount of status reporting and thereby reduces data traffic.

The controlled device processor may be further adapted, if the control command originated at the first device and has not been adhered to, to:
 send a status report message; or
 if the control command has not been adhered to but only if has not been adhered to by a margin below a threshold, inhibit sending of a status report message, and otherwise to send a status report message.

A status report message is sent, even if the command originated from the first device, if it could not be adhered to. For example, a controlled device may not have the capability to (partly or fully) adhere to a control command. Thus, a status report is sent to ensure the status monitoring device is aware that the command has not been followed (partly or fully). If the command was not adhered to but with a trivial discrepancy (e.g. rounding or quantization errors or predetermined threshold), the status report may also be inhibited.

The first device for example comprises a first device transmitter for sending control commands and a first device processor for controlling the first device transmitter, the status monitoring device comprises a monitoring device receiver for receiving status report messages, a memory storing network status data and a monitoring device processor which is adapted to maintain the network status data based on the control commands and the received status report messages.

If the first (controlling) device and the status monitoring device are not co-located in one unit, the status monitoring devices needs to know what control commands are being sent—either by sniffing on the commands (e.g. Zigbee) sent to the controlled devices, or by receiving (either via Zigbee or out-of-band) the control commands. The status monitoring device can thus update its network status data even if no reporting is received from the controlled device. This knowledge is all based on the control commands.

The status monitoring device assumes that the commands (from the first device) have been adhered to and so the status monitoring device updates network status data, e.g. a table, until a status report message indicates otherwise. Status report messages override the assumed values. This enables rapid updating of status report data, which would otherwise require polling with the associated delay.

The monitoring device processor may be adapted to populate the network status data with static values and with transient functions which indicate temporal transitions in values, and wherein the controlled device processor is adapted to generate a status report message which indicates static values and optionally also transient functions.

This measure avoids the need for repeated reporting of status changes which are following a known evolution over time ("dead reckoning"). A status report may for example be provided (if the command did not originate at the first device) at the end of the temporal transition. An alternative or addition is to extend the reporting mechanism with a report indicating not only the current value but also the transition end value and (remaining) transition time.

The status report may include an identification of the transient function, for example if the function is not already known to (e.g. set by) the status monitoring device. For example, if the controlled device processor is implementing a dimming curve known to the status monitoring device, it may suffice for the controlled device processor to report the current state, allowing the monitoring device processor to determine the function being followed.

The first device processor or the status monitoring device may be adapted to poll the controlled devices periodically for a status check. The results of the poll (even if sent from the first device) would have to be sent to the status monitoring device.

Thus, the controlled devices may perform immediate reporting in response to status changes, as well as reporting periodically based on periodic polling. Polling provides a safety net for example for missed report messages.

An overrule bit or flag may be used to enable and disable the approach of the invention, so that conventional attribute reporting may instead be used, for example in order to avoid mismatches between the actual and the administered state.

The system may comprise a networked lighting system and the controlled devices comprise luminaires, wherein the control commands comprise one or more of:
 an on/off command;
 a brightness level command;
 a color temperature command;
 a color setting command.

This is one preferred application for the networked system. There are other applications such as heating, ventilation and air conditioning systems (HVAC), traffic lighting systems, systems comprising a network of sensor nodes etc.

The invention also provides a controlled device for use in a network and for control by a first device of the network which performs a controlling function, wherein the controlled device comprises a controlled device receiver for receiving control commands from the first device, a controlled device transmitter and a controlled device processor, wherein the controlled device processor is adapted to:

receive a control command to change device status either from the first device or from another source of control commands;

change the device status in response to the control command if the controlled device is able to adhere to the control command;

determine if the control command originated at the first device;

if the control command originated at the first device and has been adhered to, to inhibit sending of a status report message to a status monitoring device; and if the control command did not originate at the first device, to send a status report message to the status monitoring device.

This controlled device inhibits status report messages when they are not needed, because the status is already known by (e.g. instructed by) the device to which the status report message would be sent. If the controlling device is co-located with the status monitoring device, e.g. in a central unit, the status monitoring function in the central unit is made aware of the control command by the controlling function in the central unit by some internal interface. Otherwise, the status monitoring device needs to be made aware of the control command.

The controlled device processor is for example further adapted, if the control command originated at the first device and has not been adhered to:

to send a status report message; or if the control command originated at the first device has not been adhered to but only if it has not been adhered to by a margin below a threshold, to inhibit sending of a status report message, and otherwise to send a status report message.

Thus, a status report message may also be inhibited if the status is sufficiently close to that expected by the first device.

The invention also provides a controlling and monitoring device of a networked system comprising: a first device of the networked system which performs a controlling function, the first device comprising: a first device transmitter for sending control commands to controlled devices of the network; a status monitoring device of a networked system, co-located with the first device, for monitoring status changes in controlled devices of the network system, wherein the status monitoring device comprises: a monitoring device receiver for receiving status report messages; a monitoring device processor; and a memory storing network status data; and wherein the monitoring device receiver, is arranged to receive status report messages from controlled devices indicating that: the controlled device changed status in response to a control command not sent by the first device; or the controlled device did not adhere to a control command sent by the first device, and wherein the monitoring device processor (30) is adapted to maintain the network status data by: when a control command is sent to a controlled device by the first device adapting the network status data of the controlled device based on the control commands sent to the controlled device, assuming adherence by the controlled device; when a status report message indicates that a control command sent by the first device to a controlled device could not be adhered to by the controlled device, adapting the network status data of the controlled device in accordance with the received status report message; and when the status report message indicates that the controlled device changed state in response to a control command not sent by the first device, adapting the network status data of the controlled device in accordance with the received status report message.

The controlling and monitoring device is for example a lighting system controller.

The invention also provides a network control method for a controlled device, for use in a networked system comprising a first device which performs a controlling function, a status monitoring device and a plurality of controlled devices amongst which the controlled device, wherein the first device is adapted to send control commands to the controlled devices and the controlled devices are adapted to send status report messages to the status monitoring device, the method comprising, at the controlled device:

receiving a control command to change device status;

changing the device status in response to the control command if the controlled device is able to adhere to the control command;

determining if the control command originated at the first device;

if the control command originated at the first device and has been adhered to, inhibiting sending of a status report message to the status monitoring device; and if the control command did not originate at the first device, sending a status report message to the status monitoring device.

This defines the method implemented by the controlled devices, by which status report messages are inhibited to reduce data traffic volumes.

The invention also provides a network control method for a controlling and monitoring device, for use in a networked system, the lighting system controller comprising a first device which sends control commands to controlled devices of the network and a status monitoring device co-located with the first device, the method comprising:

the first device: transmitting control commands to controlled devices of the network, and the status monitoring device: storing network status data; receiving a control command which has been sent to a controlled device; maintaining the network status data based on the control command; receiving a network status report message; and updating the network status data based on the received network status report message wherein the maintaining comprises: when a control command is sent to the controlled device by the first device, adapting the network status data of a controlled device based on the control commands sent to the controlled device, assuming adherence by the controlled device; and the updating comprises:

when the status report message indicates that a control command sent by the first device could not be adhered to by the controlled device, adapting the network status data of a controlled device in accordance with a received status report message and when the status report message indicates that the controlled device changed stat in response to a control command not sent by the first device, adapting the network status data of a controlled device in accordance with a received status report message.

This defines the method implemented by the controlling and monitoring device, by which status report messages are only sent, and hence received, in certain situations, to reduce data traffic volumes. The network status data is updated in accordance with the control command by default, and a status report message is received, if the network status is updated. The updates are done both on the control commands and subsequently the status report messages as they come in. Thus, the network status data may be maintained based on a control command regardless of whether or not a status report message is received, and if and when a status report message is received the network status data is (further) updated.

In these methods, the networked system may again be a lighting system and the controlled devices are luminaires, wherein the control commands comprise one or more of:
an on/off command;
a brightness level command;
a color temperature command;
a color setting command.

In these methods, the first (commanding) device is co-located with the status monitoring device in a single unit or device, such as a network controller, thus representing a controlling and monitoring device.

The invention also provides computer program comprising computer program code means which is adapted, when said program is run on a computer, to implement the methods above.

The invention also provides a data carrier which carries the computer program.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
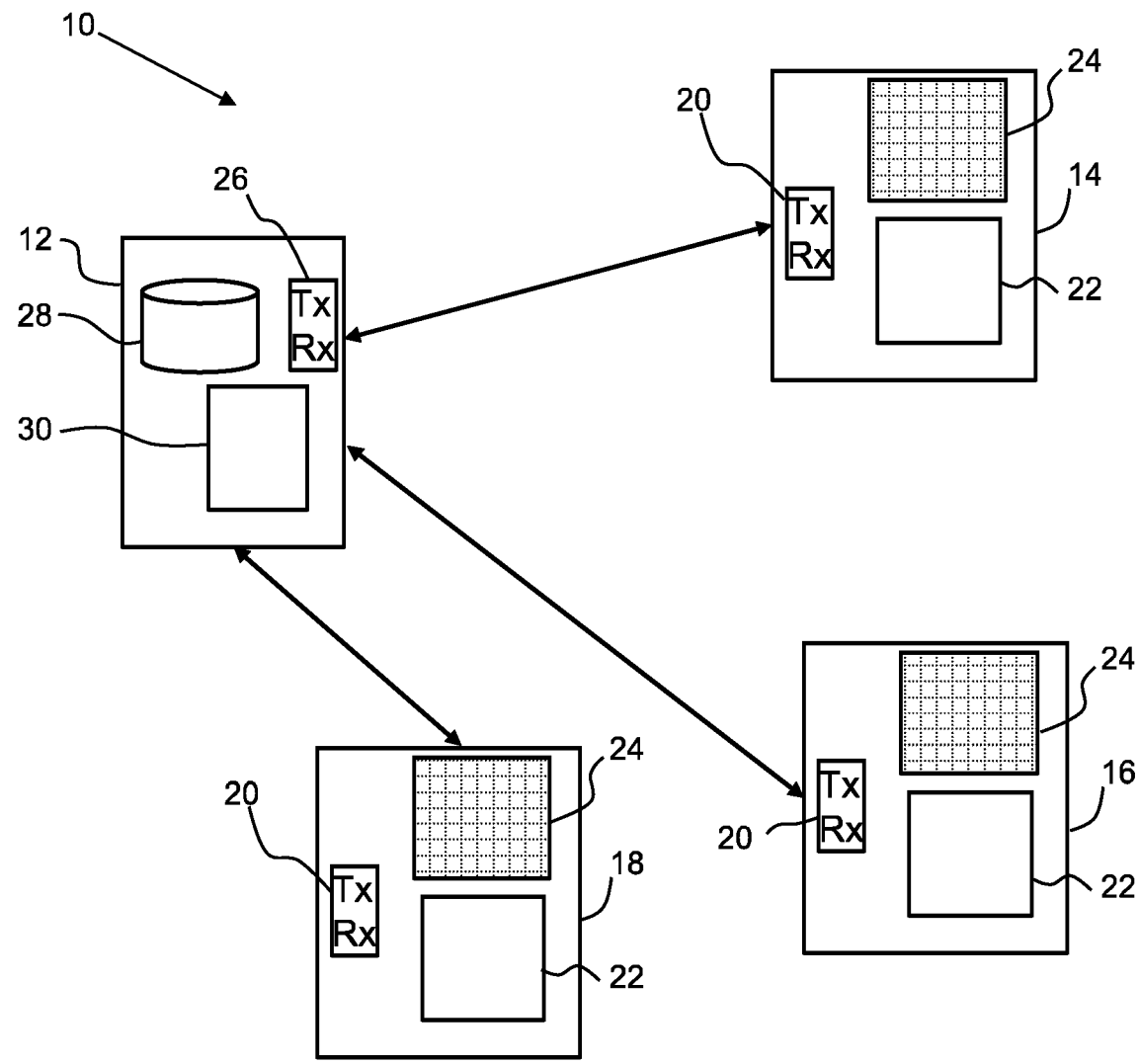
FIG. 1 shows a network of devices.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a networked system which has a first device which sends commands to one or more other devices. If those other devices are able to follow the commands, they inhibit reporting of their status. Thus, network status data is maintained based on the commands, unless status reports indicate that the commands could not be followed or that status changes have been made which were not in response to commands from the first device.

The invention provides a modification to a conventional attribute reporting scheme. Zigbee™ defines the attribute reporting, by which a device is configured to report changes in attributes. This is used for example with sensors where a light level sensor is instructed to report its last measured value periodically (e.g. every 5 minutes) or when there is a change by more than a set amount. A limit may be placed on the reporting frequency, e.g. not more often than every 5 seconds, to prevent network overload when there are rapidly changing values.

For lighting, the relevant attributes could be the on/off state, the brightness, and the color, which would be configured with a similar set of parameters.

When a network controller sends a command to set one or more of these parameters (e.g. "switch on", or "increase brightness to 75%"), and the luminaires are configured with conventional attribute reporting, they would all respond to the network controller to report that they have actually performed this change.

While this is useful for the controller to ascertain that each and every one of the devices has actually received (and processed) the command, it leads to a lot of network messages. Also, all luminaires would want to send such report message at the same time, leading to a stress of the communication algorithm (CSMA-CD). Thus, it could happen that not all reports would actually be delivered if many luminaires are involved. The controller could then falsely assume that some luminaires did not receive the control message, while actually they did but only their report did not come through. Scheduling mechanisms may be used to resolve this issue.

In existing lighting systems, it is instead known for the network controller to poll the luminaires regularly to determine their state. The main purpose is to maintain a view on the state in a database of all the luminaires in the network. This may be used by a reporting app to represent the current state of the lights, and may be used by the controller itself (e.g. a rule which triggers only when there is certain user command as well as a certain luminaire setting). This polling runs in a round robin phase (e.g. a poll for one luminaire every 2 s). Thus, for larger systems (e.g. 60 luminaires) it means a full cycle takes 120 s and the delay from a luminaire change to it being reflected in the database would on average be 60 s.

Some of this delay is addressed by storing the results of certain commands (e.g. when sending a scene recall) directly in the database, assuming the luminaire will act on it. The main purpose of polling then becomes to track those light transitions which are not triggered by the network controller itself, e.g. mains power on/off, control via Bluetooth Low Energy or a proxy approach as used for professional lighting networks, or control by other Zigbee™ controllers, sensors, switches, and devices sending scheduled commands (e.g. switching on the lights at or near sunset) which can send luminaire commands of which the network controller is not aware. With a proxy approach, a device like a smartphone may connect via Bluetooth Low Energy™, BLE, to one of the lights (which is the proxy), and the control command travels over Zigbee™ from the proxy to the other lights (the controlled devices).

Besides, there are also lighting control commands sent by the network controller which are not reflected in the database due to their transient nature. The prime example of this is an "entertainment" (streaming) feature where the network controller repeatedly sends commands to vary light intensity and/or color to a number of luminaires at a high rate (e.g. 10 times per second). Updating such changes in the database is not relevant since they will be invalidated very soon afterwards (with the next command being sent).

For all these sources of lighting changes, the latency due to the polling cycle is not solved.

The use of attribute reporting instead of (or even in addition to) polling can address some of these issues. For example, with attribute reporting, all luminaires would send all changes immediately to the network controller. Thus, the database can be updated immediately. Generally, a network is designed such that message transmission is very reliable. Hence the reporting of all light state changes can be considered a waste of a precious resource (the network bandwidth) for those messages where the network controller already knows that the luminaire changes state—because it instructed the luminaire to do so. This is the case for the majority of luminaire state changes in a networked lighting system; most changes are instructed by the network controller.

The invention thus may be considered to provide an adaptation to attribute reporting.

FIG. 1 shows a networked system 10, comprising a first device 12 which performs a controlling function. It may be a central network controller, but equally all devices of the network may be the same, and one is performing an instructing function at a particular moment in time.

There is a plurality of controlled devices 14, 16, 18.

The first device 12 sends control commands to the controlled devices and the controlled devices send status report messages back to the first device.

This example is based on the same device sending commands as receiving the status reports, to make the description more simple. However, there may be a separate status monitoring device which receives the status report messages. Thus, there may be a separate first device (which can send commands) and a separate status monitoring device (which monitors the network status). The status monitoring device will also receive the control commands so that it knows the control commands that have been sent. Some system adaptation may be required so that those messages are not filtered out. The system could for example be adapted to interpret all network traffic it can hear to deduce the state of the luminaires. For broadcast/multicast/groupcast in Zigbee the message is always received (at the physical level). For unicast it may or may not be received at the physical level. Communication between the controlling and monitoring functions could also be out-of-band (e.g. Ethernet or Wi-Fi network in the building). or even via a cloud connection. When such out-of-band communication is used, if its latency is large, the control command may arrive at the status monitoring device (a short time interval) after the status report message from the controlled device has arrived. In that case, it may be better to ignore the out-of-band control command since the status report message from the controlled device is likely a better representation of the state.

In this example, the first device and the status monitoring device are one and the same device. In particular, they are both an integral part of a network controller.

Each controlled device comprises a controlled device transceiver 20 having a controlled device receiver for receiving the control commands and a controlled device transmitter, and a controlled device processor 22.

The controlled devices have a functional unit such as a lighting unit. Each controlled device is then a luminaire in a network of luminaires, and the first device is the lighting system controller (in some cases known as the bridge, for example in the Philips™ Hue™ lighting system).

This example is thus based on a networked lighting system. The control commands then comprise one or more of:
an on/off command;
a brightness level command;
a color temperature command;
a color setting command.

This is one preferred application for the networked system. There are other applications such as home automation, heating, ventilation and air conditioning systems (HVAC), traffic lighting systems, systems comprising a network of sensor nodes etc.

The detailed operation of the system will be described with reference to a lighting example.

Each controlled device processor 22 receives a control command to change device status either from the first device 12 or from another source of commands. This other source may be another one of the devices or an external source of commands, or even direct user interaction with the device.

The controlled device processor will change the device status (e.g. change the brightness, or color or other output characteristic) in response to the control command if the controlled device is able to adhere to the command.

It then determines if the control command originated at the first device 12. For the situation that the controlling and monitoring functions are split, the determination is of course that it comes from the controlling device rather than the monitoring device.

If the control command did originate at the first device and has been adhered to, the sending of a status report message back to the first device (or to the status monitoring device if it is a separate device) is inhibited. This is the modification to a conventional attribute reporting approach.

If the control command did not originate at the first device, a status report message is sent to the first device (or to the status monitoring device if it is a separate device).

The controlled devices thus send status report messages when they have changed status in response to received commands not coming from the first device, or other events such as switching on the mains power and/or local control units. A status update is not given if the controlled device has correctly changed status in response to commands from the first device. This reduces the amount of status reporting and thereby reduces data traffic.

The controlled device processor 22 may be further adapted, if the control command originated at the first device and has not been adhered to, to send a status report message. However, if the control command has not been adhered only by a margin below a threshold, sending of a status report message is inhibited, while still maintaining an accurate overview of the state of the controlled device.

In this case, there are the following options when the command did originate at the first device:
the control command was adhered to: a status report message is inhibited;
the control command was nearly adhered to, i.e. the status was changed to within a threshold margin of the control command: a status report message is inhibited;
the control command was not even nearly adhered to, i.e. the status was not changed or else the status changed by more than the threshold margin of the control command: a status report message is sent.

If the command did not originate at the first device, a status report message is sent.

If the control command did not originate at the first device, a status report message is sent.

A status report message is thus sent, even if the command originated from the first device, if it could not be adhered to. For example, a controlled device may not have the capability to (partly or fully) adhere to a control command. Thus, a status report is sent to ensure the first device (or the status monitoring device) is aware that the command has not been followed (partly or fully). For example, a command may be to set a color temperature (e.g. 5000K) which is not supported. The closest available color temperature is then set (e.g. 4000K) and the set value is reported. If the command was not adhered to but with a trivial discrepancy (e.g. rounding or quantization errors), the status report may also be inhibited.

The controlled device can determine if the control command (e.g. to change light) originated from the first device by comparing the network address of the originator of the control command with the network address of the destination of the attribute report messages, when that is also the first device.

As mentioned above, in some network configurations, this may not be the case because the report collector is a different device to the sender of commands. One or more senders of commands may be associated with the status monitoring device, so the status monitoring device can receive the updates (i.e. be aware of the control commands that have been or will be sent) in band or out-of-band. This option may be implemented by having one or more additional parameters in the configuration of attribute reporting. Alternatively, the controlled device could be instructed (e.g. by some manufacturer specific command) to not send attribute reports if a control command from one or more addresses is received. Multiple controllers may be present whose control commands are all "known" to the monitoring function, in which case multiple addresses may be used.

Thus, one basic option is not to report when a command comes from the network device which is also the destination of reporting messages. Another option is not to report when a command comes from the network device which matches a particular network address.

The first device 12 has a first device controller transceiver 26 (with a first device transmitter for sending control commands and a first device receiver for receiving status report messages), and a memory 28 storing network status data. A first device processor 30 is used for controlling the transmitter. The first device processor maintains the network status data based on the control commands and the received status report messages.

For the example in which the first device is also the status monitoring device, it assumes that its commands have been adhered to and so updates network status data, e.g. a table, until a status report message indicates otherwise. Status report messages thus override the assumed values. This enables rapid updating of status report data, which would otherwise require polling with the associated delay.

The network status data may be any data structure or database for storing network status, which may take the form of a single table, multiple tables, lists, linked lists, etc.

There may be situations where attribute reporting is still useful, even if the first device (the originator of the commands) and the status monitoring device (reporting collector) are the same device. For example, the first device may send a command to set a luminaire to a color temperature of 2000 K. However, the device only supports 2200-5000 K due to the capabilities of the LEDs mounted in the device. It will then proceed to the closest possible value (2200 K)—and in this case reporting the actual value (2200 K) would still be needed and useful since the status monitoring device otherwise would be under the impression that the luminaire has actually moved to 2000K.

For determining whether to send this "deviation" from the instructed value, an existing Zigbee™ threshold parameter may be used to indicate how large a value should change before it is reported. In this case, the deviation is how much the actual value differs from the last reported value. An additional (dedicated) parameter could be of course instead be added in the configuration for the attribute reporting. This prevents reporting of very small changes e.g. when a luminaire is instructed to go to a color temperature of 3004 K, and due to internal quantization can only go to values of 2992 K, 3001 K, 3010 K etc. It will then use the closest possible value of 3001 K, but it makes little sense to send a report of this tiny deviation. The difference of 3K would then be below the threshold, so no report would be sent.

For those commands sent by the first device where the device cannot fully adhere to the command (see example of 2000/2200K above), the database may first be updated by the status monitoring device (to 2000 K) when sending the command. After the luminaire adopts the closest possible value (2200 K) and reports the new value, the database is then updated to the actual value of 2200 K.

When a luminaire is controlled by external means such as the mains switch, Bluetooth™ or other Zigbee™ controller, the luminaire will report to the status monitoring device to keep its database up to date, because the source of the change is not linked to the controlling device or known to the status monitoring device.

For the case of switching off mains power, the controlled device may send a so-called last breath message when it detects the power is starting to drop, so the status monitoring device is informed the device will (a) be off and (b) will no longer be reachable.

When a luminaire is controlled via streaming, no attribute reporting would be sent. The status monitoring device (or the first device) may report the current setting of the device to interested apps, or indicate a value of "varying" instead of a brightness or color value.

Some commands may involve slow transitions. For example, a "wakeup" function may be implemented whereby the first device sends a "switch on with brightness=1%" command to the luminaire, followed by a command "go to brightness=75% with 30 minutes transition time".

With normal attribute reporting, this would result in a message from the luminaire every X seconds, and a value in the database which is lagging on the actual value, because the luminaire continues to increase in brightness while the value in the database is updated only once every X seconds.

This can be improved by making the database reflect that a transition is ongoing (e.g. "moving from brightness=A at timestamp TA to brightness=B at timestamp TB"), so the actual state can always be calculated, when a device or app needs to know. In this way, the attribute report from the luminaire also reflects that such a transition is ongoing. A status report message may then be of the form "moving from brightness=A at timestamp TA to brightness=B at timestamp TB".

This status report message of course would not be required to be sent when the command originates from the device which is the status monitoring device or from another controlling device while the status monitoring device is aware of the command which was sent by the controlling device.

It may send an attribute report message when it has reached the endpoint or if the transition is interrupted by another command.

For the case of entertainment and streaming, if there is a desire to have some indication of the state of the light, the message sent out every X minutes could indicate the average brightness or color during the past X minutes, or the minimum or maximum brightness or color (in coordinate space x,y) during the past X minutes. This could then be used by apps to have some indication of the effects the luminaire is generating.

The first device processor may additionally poll the controlled devices periodically for a status check. Thus, the controlled devices may perform immediate reporting in response to status changes, as well as slower reporting based on periodic polling. Polling provides a safety net for example for missed report messages. An overrule bit or flag may be used to enable the first device to force an immediate status check.

Figure 2:
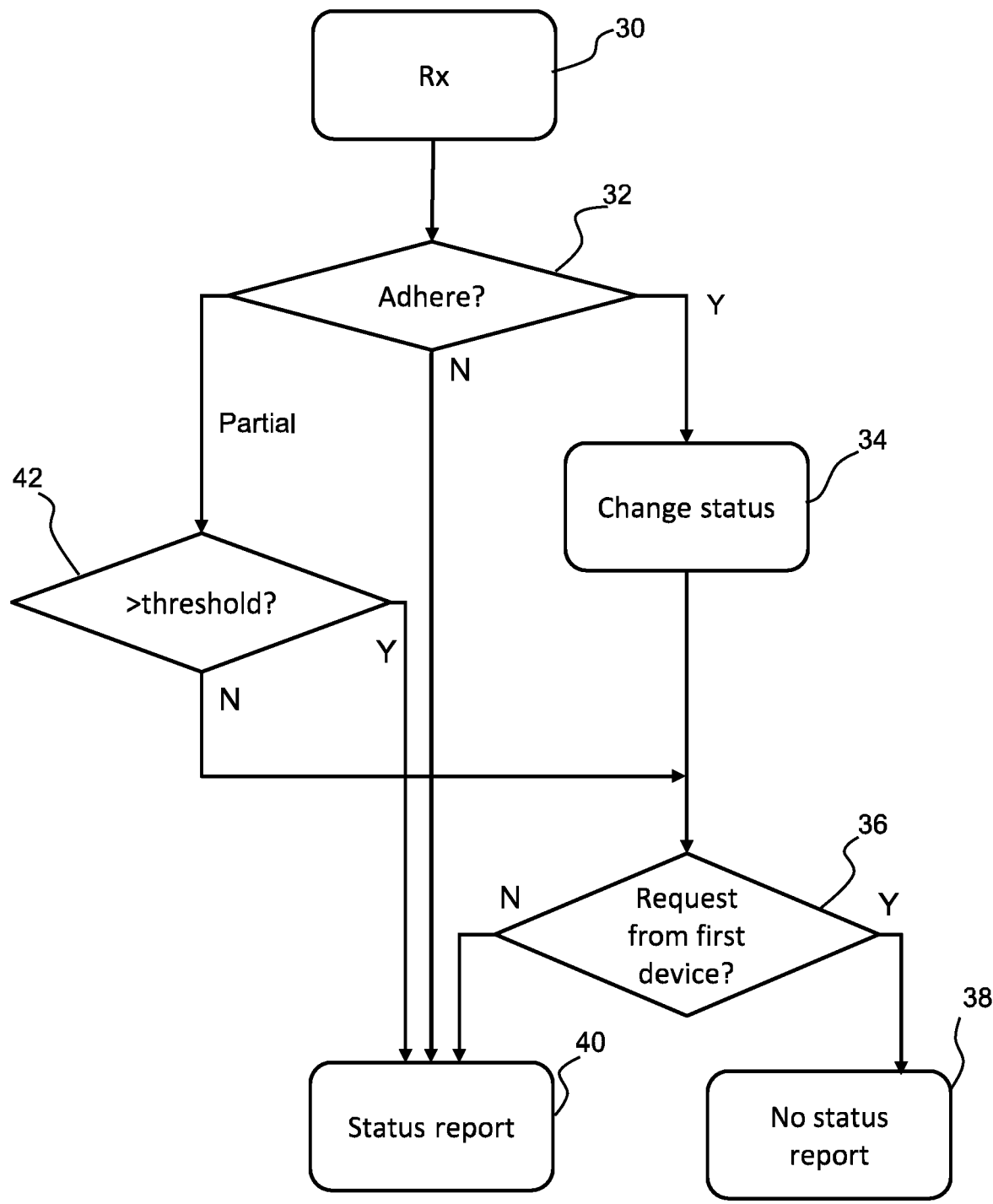
FIG. 2 shows a method carried out in a controlled device.

FIG. 2 shows a network control method for one of the controlled devices. A first device sends control commands to the controlled device.

In step 30, one such control command is received.

In step 32, the controlled device determines if it can adhere to the command. If it can, then in step 34 the controlled device changes status in response to the control command.

In step 36, the controlled device determines if the control command originated at the first device.

If the control command originated at the first device and has been adhered to, then in step 38 the sending of a status report message is inhibited, i.e. there is no message sent to a status monitoring device (which may be the first device or another monitoring device, as explained above).

If the control command did not originate at the first device, then a status report message is sent to the status monitoring device in step 40.

If the controlled device can partially adhere (such as in the light color temperature examples above) then the deviation from the command is assessed in step 42. If a threshold is exceeded, a status report message is again sent in step 40.

If the difference is less than a threshold, then the method proceeds to step 36. Thus, there is again a check of whether the control command came from the first device or not. If it did not, then a status report message is sent in step 40 and if it did then the sending of a status report message is inhibited in step 38.

Note that the implementation of transition functions is not shown, but the method may be extended as explained above.

Although the network control method depicted in FIG. 2 shows three options in relation to step 32, i.e. "adhered to", "not adhered to", "partially adhered to", the "partially adhered to" is not always necessary. A simple example where the "partially adhered to" does not make sense is when the state change is a binary state change; here the "partial adhered to" does not make sense. However, even when considering an embodiment wherein the state change is non-binary, such as in a system that allows the dimming of light, strict compliance may be required in which case it may be a design decision to only use "adhered to" and "not adhered to". Such a decision will however come at an increase in status reports and thus may incur a higher network load.

Figure 3:
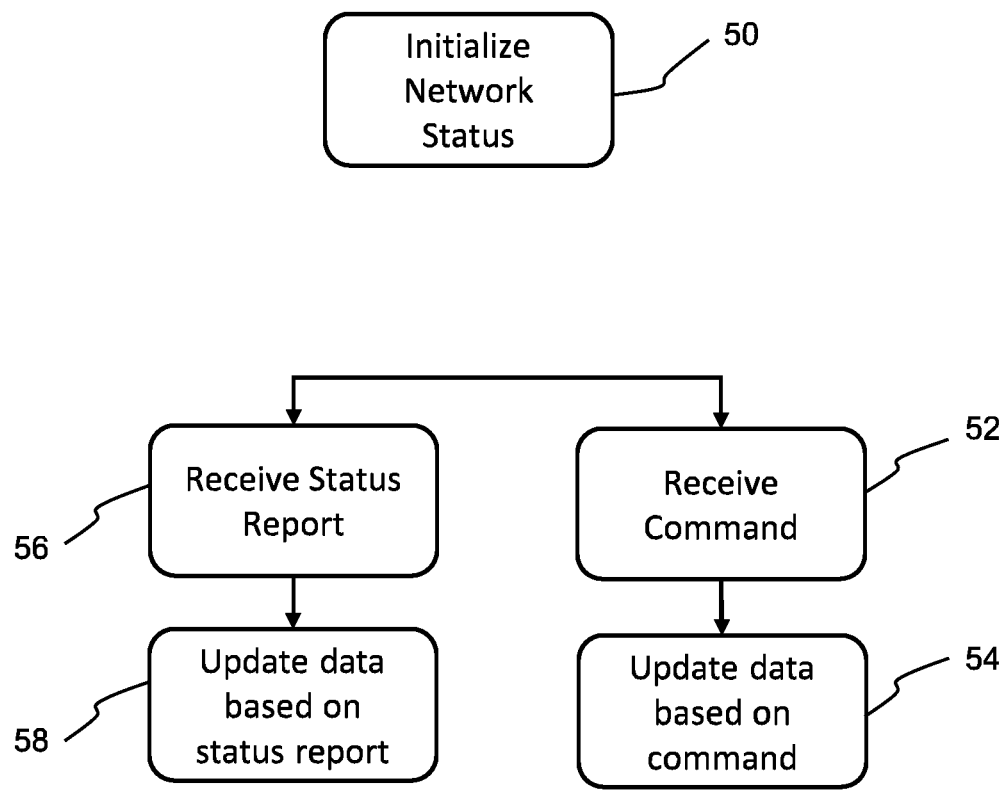
FIG. 3 shows a method carried out in a status monitoring device, which may be the device which sends the control commands.

FIG. 3 shows a network control method for the status monitoring device.

In step 50, the network status data is initialized.

If in step 52, a control command is received, which has been sent to a controlled device then in step 54, the network status data is maintained based on the control command.

If in step 56, a network status report message is received (e.g. which was prompted by a control command), then in step 58, the network status data is updated based on the received network status report message.

These two branches operate in parallel. For example, a command may be received first and then a status report may be received which will override the update in step 54. Alternatively, a status report may be received without the having been a received control command.

The status monitoring device stores network status data. In particular, the status monitoring device stores both status based on control commands sent as well as status from reports coming in. The status is updated in response to the known control commands and is then updated further if the status report messages are received.

The invention is of particular interest for outdoor lighting networks (e.g. streetlights, where a centralized controller maintains a mirror of the state of all streetlights) or alternatively indoor lighting networks in a building control system or a consumer system.

The first device may indicate in commands whether or not it requires attribute reporting. For example, the method of the invention may be set as an optional mode of operation among multiple possible modes of operation.

The example above is based on a central controller and a set of devices which report back to the central controller or to a dedicated monitoring device. Other configurations are possible. For example, there may be multiple parties interested in the state. The central controller and/or status monitoring devices can set up attribute reporting on the controlled devices and this may lead to multiple entries where the reporting needs to be sent.

A central controller may not have the enabled reporting whereas the network devices (e.g. mobile phones) have the enabled reporting.

As mentioned above, the attribute reporting as defined in Zigbee™ can be configured to send a report when there is a significant change since the last reported value, and (in case there are no such significant changes) still send a report message every N minutes. This report every N minutes is relevant in the case of missed report messages: eventually the 'state cache' in the interested receiving device will be correct. This report every N minutes can also be used to determine if a device is still reachable (it may have been powered down, or suffering from a bad connection). The timeout N may be made to depend on the observed behavior. For example when a device proves to be reliable (meaning reports come in every N minutes, and the reported value matches the "cache"), the timeout N can be increased. This reduces the amount of traffic. When a device proves to be unreliable (meaning reports don't come in every N minutes, or the reported value deviates from the "cache" suggesting other sources of control), the timeout N can be decreased for that device.

When a device is unreachable for some periods, indicative of being mains-powered-down for some periods by the user, the timeout N could be reduced so the power-down is detected earlier (whereas the detection of "non reachable" is conventionally typically is when no message has been received for M*N minutes) where M is a factor indicating how many missing messages are needed before the device is considered unreachable.

For situations where some devices in a system support the method described above, and some do not, the first device (central controller) could apply a mix of measures. For example, attribute reporting as described above may be used for devices that support it and normal attribute reporting may be used for other devices. Alternatively, attribute reporting as described above may be used for devices that support it and polling may be used for other devices.

There could also be situations where attribute reporting is combined with polling. The first device (in collaboration with the status monitoring device if separate) could normally rely on attribute reporting. However, it could additionally poll devices in specific situations, e.g. when the device regularly becomes unreachable (meaning the attribute report messages have been lost) or if polling shows a different value than the "cache", increase the polling rate. After a while, if the polling shows consistent values again, the polling rate can be decreased.

Polling involves asking the device for current value of attributes like on/off state and brightness level. The device is typically mandated to answer these requests. A further extension would be to allow the controlled devices to be made disobedient in certain situations and not respond in case there is no change. At present, the central controller would then consider the controlled device to be unreachable. However, if both the central controller and the controlled device are adapted to such an approach, the amount of messages could be reduced.

The first device could for example send a number of polling messages to each device regularly possibly combined into a single command, with no answers (if the system is in stable state).

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. A networked system, comprising:
a first device which performs a controlling function;
a status monitoring device; and
a plurality of controlled devices, wherein the first device is adapted to send control commands to the controlled devices and the controlled devices are adapted to send status report messages to the status monitoring device, wherein each controlled device comprises a controlled device receiver for receiving control commands, a controlled device transmitter and a controlled device processor, wherein the controlled device processor is adapted to:
receive a control command to change device status either from the first device or from another source of commands;
change the device status in response to the control command if the controlled device is able to adhere to the command;
determine if the control command originated at the first device;
if the control command originated at the first device and has been adhered to, inhibit sending of a status report message to the status monitoring device; and
if the control command did not originate at the first device, to send a status report message to the status monitoring device.

2. The system as claimed in claim 1, wherein the controlled device processor is further adapted, if the control command originated at the first device and has not been adhered to, to:
send a status report message; or
if the control command has not been adhered to but only if it has not been adhered to by a margin below a threshold, inhibit sending of a status report message, and otherwise to send a status report message.

3. The system as claimed in claim 1, wherein the first device comprises a first device transmitter for sending control commands and a first device processor for controlling the first device transmitter, the status monitoring device comprises a monitoring device receiver for receiving status report messages, a memory storing network status data and a monitoring device processor which is adapted to maintain the network status data based on the control commands and the received status report messages.

4. The system as claimed in claim 3, wherein the monitoring device processor is adapted to populate the network status data with static values and with transient functions which indicate temporal transitions in values, and wherein the controlled device processor is adapted to generate a status report message which indicates static values and optionally also transient functions.

5. The system as claimed in claim 1, wherein the first device processor or the status monitoring device is adapted to poll the controlled devices periodically for a status check.

6. The system as claimed in claim 1, comprising a networked lighting system and the controlled devices comprise luminaires, wherein the control commands comprise one or more of:
an on/off command;
a brightness level command;
a color temperature command;
a color setting command.

7. A controlled device for use in a network and for control by a first device of the network which performs a controlling function, wherein the controlled device comprises a controlled device receiver for receiving control commands from the first device, a controlled device transmitter and a controlled device processor, wherein the controlled device processor is adapted to:
receive a control command to change device status either from the first device or from another source of control commands;
change the device status in response to the control command if the controlled device is able to adhere to the control command;
determine if the control command originated at the first device;

if the control command originated at the first device and has been adhered to, inhibit sending of a status report message to a status monitoring device; and
if the control command did not originate at the first device, to send a status report message to the status monitoring device.

8. The controlled device as claimed in claim 7, wherein the controlled device processor is further adapted, if the control command originated at the first device and has not been adhered to:
to send a status report message; or
if the control command originated at the first device has not been adhered to but only if it has not been adhered to by a margin below a threshold, to inhibit sending of a status report message, and otherwise to send a status report message.

9. The controlled device as claimed in claim 7, wherein the controlled device is a luminaire.

10. A networked system, comprising:
a first device which performs a controlling and status monitoring function in the networked system, and a plurality of controlled devices,
wherein the first device is adapted to send control commands to the controlled devices and the controlled devices are adapted to send status report messages to the first device,
wherein each controlled device comprises a controlled device receiver for receiving control commands, a controlled device transmitter and a controlled device processor, wherein the controlled device processor is adapted to:
receive a control command to change device status either from the first device or from another source of commands;
change the device status in response to the control command if the controlled device is able to adhere to the command;
determine if the control command originated at the first device;
if the control command originated at the first device and has been adhered to, inhibit sending of a status report message to the first device; and
if the control command did not originate at the first device, to send a status report message to the first device.

11. The system of claim 10, wherein the first device, is a lighting system controller.

12. A network control method for a controlled device, for use in a networked system comprising a first device which performs a controlling function, a status monitoring device and a plurality of controlled devices amongst which the controlled device, wherein the first device is adapted to send control commands to the controlled devices and the controlled devices are adapted to send status report messages to the status monitoring device, the method comprising, at the controlled device:
receiving a control command to change device status;
changing the device status in response to the control command if the controlled device is able to adhere to the control command;
determining if the control command originated at the first device;
if the control command originated at the first device and has been adhered to, inhibiting sending of a status report message to the status monitoring device; and
if the control command did not originate at the first device, sending a status report message to the status monitoring device.

13. The system of claim 10, wherein the status report message when a command was partially adhered to indicates the current status of the controlled device and a monitoring device processor adapts to maintain the network status data of the controlled device accordingly.

14. A non-transitory computer readable medium comprising instructions which, when said instructions are executed by a computer, cause the computer to perform the method of claim 12.

15. The system of claim 10, the first device comprising:
a first device transmitter for sending control commands to controlled devices of the network;
a status monitoring apparatus, for monitoring status changes in controlled devices of the network system, wherein the status monitoring apparatus comprises:
a monitoring device receiver for receiving status report messages;
a monitoring device processor; and
a memory storing network status data; and
wherein the monitoring device receiver, is arranged to receive status report messages from controlled devices indicating that:
the controlled device changed status in response to a control command not sent by the first device; or
the controlled device did not adhere to a control command sent by the first device, and
wherein the monitoring device processor is adapted to maintain the network status data by:
when a control command is sent to a controlled device by the first device adapting the network status data of the controlled device based on the control commands sent to the controlled device, assuming adherence by the controlled device;
when a status report message indicates that a control command sent by the first device to a controlled device could not be adhered to by the controlled device, adapting the network status data of the controlled device in accordance with the received status report message; and
when the status report message indicates that the controlled device changed state in response to a control command not sent by the first device, adapting the network status data of the controlled device in accordance with the received status report message.

* * * * *